United States Patent Office 2,861,868
Patented Nov. 25, 1958

2,861,868

METHOD OF PRODUCING SUBSTANTIALLY WHITE, GLOBULAR SODIUM BISULFATE

Joseph G. Stites, Jr., Chelmsford, and David C. Taylor, Everett, Mass., assignors to Monsanto Chemical Company, St. Louis, Mo., a corporation of Delaware No Drawing. Application October 18, 1956
Serial No. 616,614

6 Claims. (Cl. 23—121)

This invention relates to an improved chemical process for the commercial production of substantially white, globular sodium bisulfate. More specifically this invention relates to the production of substantially white, globular sodium bisulfate by the action of sulfuric acid on crude sodium chloride, i. e. "solar salt," wherein the product is treated with a small quantity of sodium nitrate.

The compound $NaHSO_4$ has been variously known as nitre or niter cake, sodium hydrosulphate, sodium acid sulfate, or sodium bisulfate. The production of sodium bisulfate is old and well known in the prior art. Historically, sodium bisulfate was long produced, as a by-product in the preparation of nitric acid, by the reaction of sulfuric acid on sodium nitrate, hence the early name nitre cake. Currently the bulk of sodium bisulfate is produced by the reaction of sulfuric acid on refined sodium chloride, with the simultaneous production of hydrochloric acid. The commercial sodium bisulfate so produced varies in color from a light yellow to a dark yellow and often has a residual hydrochloric acid odor. The off-color is brought about by the presence of impurities in the commercial raw materials and contamination due to corrosion and erosion of the processing equipment. This off-color is overcome by the addition of from about 0.01 to about 0.5 and preferably from about 0.02 to about 0.1 percent equivalents, based on the sodium bisulfate, of zinc metal in the form of an inorganic salt, wherein the anion moiety of the salt is compatible and/or volatile under the conditions of the process, e. g., zinc sulfate, zinc oxide, etc., to the molten sodium bisulfate prior to conversion from the liquid to the solid phase, as disclosed and claimed in the patent application of W. M. Davis and A. L. Fisher, Serial No. 473,480, filed December 6, 1954. However, when solar salt is substituted for refined salt in the aforesaid process the product still has a gray to grayish-brown appearance due to the presence of carbonaceous material therein. The carbonaceous material may be burned out, but the cost of this operation overcomes the advantage of using the cheaper solar salt in place of the refined salt, thus we have found that it is necessary to roast the solar salt at 600° C. for about one hour in order to obtain a sodium bisulfate product which is equivalent to that produced from refined salt.

It is an object of the instant invention to provide a novel modification of the commercial process for the production of sodium bisulfate whereby a substantially white product is obtained. Another object of the instant invention is to produce the aforesaid substantially white sodium bisulfate by a novel process which employs solar salt in place of refined salt. Other objects will be apparent to those skilled in the art in view of the following disclosure.

The sodium bisulfate is produced in the conventional manner, as for example, by the reaction of solar salt with sulfuric acid at an elevated temperature with the evolution of hydrogen chloride. The molten sodium bisulfate is transferred from the reaction vessel into a storage vessel wherein it is treated in accordance with the present invention.

It has now been found that the addition of from about 0.02 to about 2 and preferably from about 0.02 to about 0.5 weight percent of sodium nitrate, based on the sodium bisulfate, added to the molten sodium bisulfate and held in the molten state for at least about 15 minutes prior to conversion from the liquid to the solid phase provides a substantially white product in contradistinction to the gray to grayish-brown product obtained when no sodium nitrate is employed. The sodium nitrate can be added to the molten sodium bisulfate as a dry powder or in an aqueous solution as hereinafter more fully pointed out. Whereas the sodium nitrate can be used alone it is preferably added in addition to the inorganic zinc salt, such as zinc sulfate, disclosed in the aforementioned patent application Serial No. 473,480. Preferably the two salts are added simultaneously to the molten sodium bisulfate, but the order of addition is not critical. The temperature of the molten sodium bisulfate at the time of the addition of the sodium nitrate, with or without the zinc salt, is from about 190° to about 250° C. and preferably from about 200° to about 225° C. and is maintained by an external heat source. The molten mass is kept under agitation to effect uniform distribution of the sodium nitrate, or sodium nitrate and zinc salt, and maintain a substantially uniform temperature throughout same. When the sodium nitrate, or sodium nitrate and zinc salt, is added as a solution, the water should not be excessive, but a small amount of water is beneficial in representing the conversion of a portion of the sodium bisulfate to the sodium pyrosulfate.

Thereafter the sodium bisulfate is solidified by any suitable means, as for example, cooling in molds, flowing over a chilled rotary drum to produce flakes, by projecting droplets of sodium bisulfate in a cooling air medium and providing a sufficient volume of cooling air for a given suspension time to effect solidification of the droplets before they reach the bottom of the spray chamber, etc. The production of globular sodium bisulfate is most desirable since this method provides a relatively uniform, dust-free product with a minimum of labor.

Thereafter the globular sodium bisulfate is cooled and, if desired, classified to remove any agglomerated particles and a small amount of fines, both of which fractions can be reworked by returning to the storage vessel. Then the cooled, uniformly sized, globular sodium bisulfate preferably is blended uniformly with from about 0.1 to about 0.5 percent, based on the sodium bisulfate, of dry, finely powdered sodium carbonate to remove any residual hydrochloric acid odor from the product. Preferably the sodium carbonate should substantially all be in the particle-size range of from about 250 to about 325 mesh (Standard U. S. Sieve Series) since it has been found that sodium carbonate in this particle-size range seems to adhere to the sodium bisulfate particles and thereby avoids subsequent segregation in handling.

The instant invention is exemplified by the following illustrative examples:

Example I

In a batch process 60 parts by weight of dried and ground solar salt and 91 parts by weight of 100% sulfuric acid were introduced into a reaction vessel and heated to 300° C. until the evolution of hydrogen chloride was terminated. The molten sodium bisulfate was then cooled to about 250° C. and about 5 percent, by weight of the molten sodium bisulfate, of water was slowly added thereto while maintaining the temperature of the material above about 210° C. Then 0.05 percent by weight of sodium nitrate and 0.05 percent by weight of zinc, as zinc sulfate, based on the sodium bisulfate, were added thereto and the molten material was agitated for about 20 minutes after which time the molten product was solidified by chilling. The color of the sodium bisulfate was equivalent to that obtained when refined salt was employed without the use of sodium nitrate, i. e. a substantially white color.

*Example II*

The batch process of Example I was repeated except that the sodium nitrate was omitted therefrom. The resulting sodium bisulfate was a dirty gray color.

*Example III*

In a continuous process solar salt, dried and ground to pass a 20-mesh screen, and 100% sulfuric acid in a mole ratio of about 1.08 to 1.0 were introduced into a reaction vessel at a substantially uniform rate and were reacted at about 300° C. with the evolution of hydrogen chloride gas. The molten sodium bisulfate was continuously transferred to a storage vessel having a capacity of about 5 tons of sodium bisulfate, where it was held at a temperature of about 225° C. Initially sufficient solid sodium nitrate and zinc sulfate were added with agitation to provide 0.05 percent by weight of the sodium nitrate and a zinc equivalent concentration of 0.05 percent by weight of zinc, based on the sodium bisulfate. Thereafter sodium nitrate as a 12 percent aqueous solution was metered into the molten sodium bisulfate at the rate of one pound of sodium nitrate per ton of sodium bisulfate and zinc sulfate, containing 25.5 percent zinc, in the form of a 12 percent aqueous solution was metered into the molten sodium bisulfate at the rate of 3.92 pounds of solid zinc sulfate per ton of sodium bisulfate. The molten material was then solidified by projecting droplets through a cooling air medium. Thereafter the globular sodium bisulfate was further cooled and the fines and the agglomerated particles were removed such that the product consisted of solidified globules of screen size principally of from about −12 mesh to about +40 mesh with the bulk of the product having a particle size of the order of about 20 mesh. Then sodium carbonate having a particle size of from about 250 to about 325 mesh was added in sufficient amount to provide 0.2 percent by weight, based on the sodium bisulfate (4 pounds per ton of sodium bisulfate), and blended therewith. The white, globular sodium bisulfate was free from hydrochloric acid odor and was regarded as a very desirable improvement by the trade. The sodium bisulfate prepared in this manner has an available $H_2SO_4$ content of about 37 percent.

The sodium nitrate must be held in the molten sodium bisulfate for at least about 15 minutes and preferably for about 30 minutes or longer to effect the oxidation of the carbonaceous material introduced into the system from the solar salt. The zinc salt should also be retained in the molten sodium bisulfate for at least about 15 minutes prior to solidification. The capacity of the heated storage vessel is generally large such that the sojourn time will normally be sufficiently long to provide the necessary time for substantially complete reaction of the sodium nitrate. However, since fresh material is being added constantly to the storage vessel in a continuous process, a small amount of the freshly introduced material will always be contained in the final product where a conventional storage vessel is employed. The by-passing of a minor portion of the product in a shorter period than indicated above can be readily overcome by the installation of suitable baffles, the employment of a two-stage storage vessel, or other suitable means to reduce the portion of untreated material which would otherwise be contained in the final product.

The mole ratio of the sodium chloride to sulfuric acid can be varied as desired, e. g., to provide a product having from about 30 to about 45 percent available $H_2SO_4$, but preferably a mole ratio of sodium chloride:sulfuric acid in the range of from about 1.03:1 to about 1.15:1 is employed. On the one hand the higher mole ratio of $NaCl:H_2SO_4$ provides increasing amounts of sodium sulfate in the product and its presence materially increases the temperature necessary to maintain a satisfactory fluidity of the molten mixture, whereas on the other hand the presence of too much free sulfuric acid, ratios of $NaCl:H_2SO_4$ of less than one, precludes the formation of free-flowing globular sodium bisulfate.

We claim:

1. In the process of producing substantially white sodium bisulfate from the reaction of sulfuric acid and crude solar salt at an elevated temperature to produce molten sodium bisulfate the step comprising the addition to the molten sodium bisulfate of from about 0.02 to about 2 percent by weight of sodium nitrate, based on the sodium bisulfate, and maintaining the sodium bisulfate in a molten condition for at least about 15 minutes after the addition of the sodium nitrate prior to solidification.

2. The process of claim 1, wherein from about 0.02 to about 0.1 percent by weight of finely divided sodium nitrate is employed.

3. The process of claim 1, wherein from about 0.02 to about 0.1 percent by weight of sodium nitrate is added as an aqueous solution.

4. In the process of producing substantially white, globular sodium bisulfate the steps comprising the reaction of crude solar salt and sulfuric acid in a mole ratio of from about 1.03:1 to about 1.15:1 at a temperature of from about 300° to about 325° C.; cooling the molten sodium bisulfate reaction product to from about 200° to about 225° C. and adding thereto from about 0.02 to about 0.1 percent by weight of sodium nitrate, based on the sodium bisulfate, and uniformly distributing the sodium nitrate in the molten sodium bisulfate by suitable agitation and maintaining the mixture at from about 200° to about 225° C. for at least about 15 minutes after the addition of the sodium nitrate; and thereafter effecting solidification of droplets of the molten sodium bisulfate while air-borne by projecting droplets of molten sodium bisulfate in a cooling-air medium and providing a sufficient volume of cooling air for a given suspension time to effect solidification of the said droplets before they are removed from suspension.

5. The process of claim 4, wherein the reaction temperature is from about 300° to about 305° C. and about 0.05 percent by weight of sodium nitrate is added to the reaction product held at about 210° C.

6. The process of claim 4, wherein from about 0.02 to about 0.1 percent zinc, based on the sodium bisulfate, as a zinc salt selected from the group consisting of zinc sulfate, zinc oxide, and mixtures thereof, is also added to the molten sodium bisulfate.

References Cited in the file of this patent

UNITED STATES PATENTS

| | | |
|---|---|---|
| 2,117,467 | White | May 17, 1938 |
| 2,208,175 | Wilson | July 16, 1940 |